United States Patent [19]
Ford et al.

[11] 3,736,470
[45] May 29, 1973

[54] METHOD AND APPARATUS FOR DETECTING PHASE IMBALANCES
[75] Inventors: David E. Ford, Milwaukee; Richard W. Waltz, New Berlin, both of Wis.
[73] Assignee: Allen-Bradley Company, Milwaukee, Wis.
[22] Filed: Nov. 15, 1971
[21] Appl. No.: 198,597

[52] U.S. Cl..................317/27 R, 307/127, 317/47, 317/48
[51] Int. Cl................................H02h 3/28
[58] Field of Search.....................317/27 R, 48, 47, 317/18 D, 31; 307/127; 340/253 H, 253 Y; 324/86, 87; 323/109, 122; 318/563, 207

[56] References Cited
UNITED STATES PATENTS
2,975,334   3/1961   Callan.....................................324/86
3,188,522   6/1965   Culbertson............................324/86
2,914,703   11/1959  Clark......................................307/127

Primary Examiner—J. D. Miller
Assistant Examiner—Harvey Fendelman
Attorney—Barry E. Sammons and Thomas O. Kloehn

[57] ABSTRACT

A reference point is established by phase resistors connected to each of three power lines. The referenced voltage established across one of the phase resistors has a 30° phase lag emparted to it and the voltage established across a second phase resistor has a thirty degree phase lead emparted to it. Under normal operating conditions the two phase-displaced voltages cancel when summed by an annunicator circuit, but when an imbalance or phase failure occurs in the power source, cancellation is not obtained and an annunciation signal is generated. A second embodiment emparts a 60° phase lead to a first referenced voltage and a 60° phase lag to a second referenced voltage. The phase-displaced voltages are identical under normal operating conditions, but when an imbalance or phase failure occurs in the power source, a difference is sensed by the annunciator circuit and an annunciation signal is generated.

9 Claims, 7 Drawing Figures

Patented May 29, 1973 3,736,470

METHOD AND APPARATUS FOR DETECTING PHASE IMBALANCES

BACKGROUND OF THE INVENTION

The field of the invention is methods for detecting phase failures and phase imbalances in polyphase power sources.

It is very important to protect against a total or partial phase failure which causes a current imbalance in the power lines. It is standard practice to provide means for detecting overload currents in all of the power lines. However, a destructive unbalanced load current can occur without producing a significant change in the total current being supplied to the polyphase load. In other words, the current in one power line may drop below the nominal operating magnitude or the current in another line increase above the nominal operating magnitude without significantly affecting the total current supplied. This potentially destructive situation is not sensed by devices which rely upon measuring the total load current to detect an abnormal operating condition. While phase failure protection circuits have been devised in the past, none has been entirely satisfactory.

There are numerous methods available for detecting the loss of one or more phases of a polyphase voltage source and shutting down the driven apparatus. One such method is illustrated in both U.S. Pat. No. 3,401,308 issued to J.A. Darke, and U.S. Pat. No. 3,368,129 issued to B.P. Chausse et al. The method disclosed therein employs a current transformer in each power line which is connected to generate a secondary voltage proportional to the current in that power line. By comparing these voltages, current imbalances or the loss of one or more phases can be detected. A second type of phase imbalance or phase failure detection method is illustrated in U.S. Pat. No. 3,243,796 issued to S.A. Harmon et al. In this method the polyphase voltage is rectified and partially filtered to provide a d-c voltage component and an a-c ripple component. When a phase is lost or becomes imbalanced, the ripple component increases and this increase is detected to shut down the apparatus, It should be noted that these prior methods lack versatility. Namely, they will not detect phase failures, phase imbalances and phase reversals in polyphase voltage sources.

SUMMARY OF THE INVENTION

The invention comprises a method and means for detecting both a phase failure in a polyphase voltage source and a current imbalance in a polyphase voltage source. More specifically, the method is performed by first establishing a neutral reference voltage to which each of the phases is referred; selecting a pair of the referenced phases and imparting a preset phase shift to them to render them coincident when the polyphase voltage source is balanced; and combining the selected pair of phase shifted phases to generate an annunciation signal when they are not coincident.

When the invented method is applied to a three-phase power source, the establishment of the neutral reference voltage provides three referenced phases. Each phase is equal in magnitude and is phase displacd 120° from the other phases under normal operating conditions. By imparting the appropriate phase shift to either one or two of these referenced phases, a pair of them can be brought into coincidence with each other. When coincident, the selected phases are equal in amplitude and either in phase or 180° out of phase. Thus, under normal conditions these two coincident phases will cancel if summed or subtracted. If the phase relationship of the phases becomes imbalanced, cancellation cannot be obtained and a fault indication, or annunciation signal is generated.

A general object of the invention is to provide a versatile and reliable method for detecting phase failures and phase imbalances in a three-phase power source. The neutral reference voltage can be established using a transformer or resistors and the phase shift is imparted by a resistor-capacitor circuit. The summation or subtraction is performed by a transistor amplifier circuit. All the components are, therefore, durable and easy to maintain in difficult environments.

Another object of the invention is to provide a method for detecting phase failures and phase imbalances, which method and means does not require the insertion of active or passive devices in the power line. The method requires that the polyphase voltages be sensed, and therefore, the transformer or resistors used to sense the polyphase voltages are connected across the power lines instead of being inserted in circuit with them.

Still another object of the invention is to provide a means of detecting phase failures, phase imbalances and phase reversals in a polyphase voltage source.

The foregoing and other objects and advantages of the invention will appear from the following description. In the description reference is made to the accompanying drawings which form a part hereof, and in which there is shown by way of illustration preferred embodiments of the invention. Such embodiments do not necessarily represent the full scope of the invention, and reference is therefore made to the claims herein for interpreting the breadth of the invention.

DESCRIPTION OF THE PREFERRED EMBODIMENTS

Figure 1:
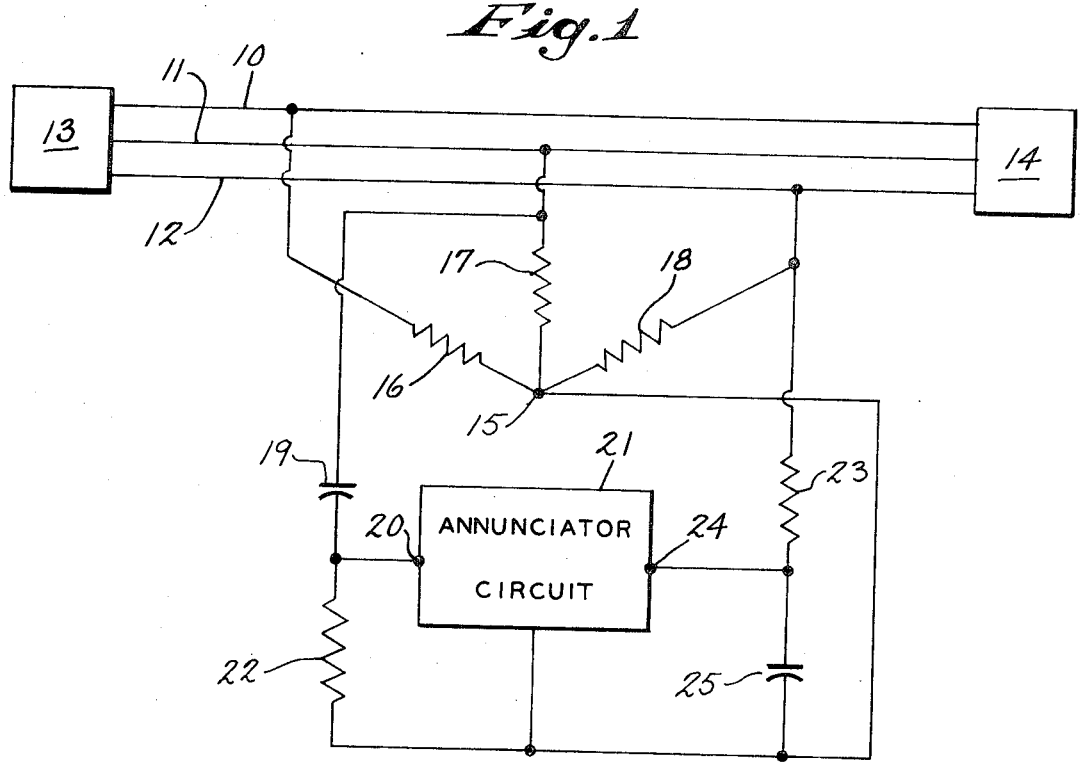
FIG. 1 is an electrical schematic diagram of a first embodiment of the invention.

Referring to FIG. 1, a circuit for implementing the invented method is shown connected to three power lines 10, 11 and 12. The power lines 10, 11 and 12 conduct three-phase alternating current from a power supply 13 to a load 14. Under normal operating conditions the average current in each power line 10, 11 and 12 is equal in magnitude, and the voltage measured across any pair of the power lines 10, 11 and 12 is 120° out of phase with the voltage measured across any other pair.

A reference voltage is established at a reference point 15 by the connection of a first phase resistor 16 between the reference point 15 and first power line 10, the connection of a second phase resistor 17 between the reference point 15 and second power line 11, and the connection of a third phase resistor 18 between reference point 15 and the third power line 12. The three resistors 16, 17 and 18 are equal in value, and under balanced conditions, equal voltages are establihsed across each of them.

Figure 2:
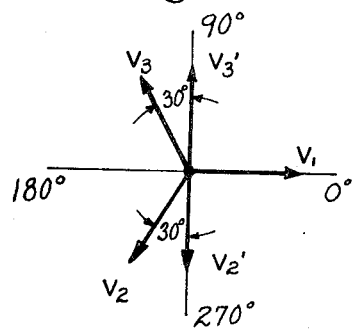
FIGS. 2 and 3 are phasor diagrams which indicate the phase relationship of voltages at various points in the circuit of FIG. 1.

Referring to FIG. 2, the alternating voltages established across the phase resistors 16, 17 and 18 are all referenced to the point 15 and are represented by the respective phasors $V_1$, $V_2$ and $V_3$. By convention, the phasors $V_1$, $V_2$ and $V_3$ revolve in the counter-clockwise direction at power source frequency. The phasor diagram stops, or looks at each referenced phase voltage at one instance in time. The length of each phasor $V_1$, $V_2$ and $V_3$ indicates the peak voltage of the referenced phase voltage it represents, and its orientation indicates its phase relationship to the other referenced phases.

Under balanced operating conditions, if phasor $V_1$ is stopped at the zero degree axis as shown in FIG. 2, phasor $V_2$ "lags" 120 degrees behind phasor $V_1$ and phasor $V_3$ leads 120 degrees "ahead." It can be observed that by shifting phasor $V_2$ 30° ahead and imparting a 30° phase lag to phasor $V_3$, the resulting phasors $V_2'$ and $V_3'$ will be 180° out of phase. In other words, by imparting a 30° phase shift to the referenced phases generated across phase resistors 17 and 18, the resultant voltages will be coincident when the three-phase power supplied to the load 14 is balanced and in the proper sequence. It should be apparent that either, or both, phasors $V_2$ and $V_3$ may be shifted to provide the "net" 60° phase shift necessary to bring them into coincidence. It should also be noted that when referring to the first embodiment in FIG. 1, the term "coincidence" indicates that the voltages represented by phasors $V_2'$ and $V_3'$ are equal in magnitude and frequency, and 180° out of phase.

Referring again to FIG. 1, one lead of a first capacitor 19 is connected to power line 11 and its other lead connects to an input terminal 20 of an annunciator circuit 21. One lead of a first resistor 22 connects to input terminal 20 and its other lead connects to common point 15. First capacitor 19 and first resistor 22 impart a 30° phase lead to the referenced voltage generated across second phase resistor 17. The resulting phase-displaced voltage is applied to the annunciator circuit 21. The values of first capacitor 19 and first resistor 22 are chosen according to the following expression:

$$\tan 30° = 1/2\pi f R_1 C_1$$

where $f =$ power supply frequency

One lead of a second resistor 23 connects to power line 12 and its other lead connects to an input terminal 24 on the annunciator circuit 21. One lead of a second capacitor 25 also connects to input terminal 24 and its other lead connects to reference point 15. The values of second resistor 23 and second capacitor 25 are chosen according to the following expression:

$$\tan 30° = 2\pi f C_2 R_2$$

Second resistor 23 and second capacitor 25 impart a 30° phase lag to the referenced voltage generated across third phase resistor 18. The resulting voltage is applied to input terminal 24 of annunciator circuit 21.

Referring to FIG. 2, under balanced operating conditions an alternating voltage represented by the phasor $V_2'$ is generated across first resistor 22 and applied to annunciator input terminal 20, and an alternating voltage represented by the phasor $V_3'$ is generated across second capacitor 25 and applied to annunciator input terminal 24. The annunciator circuit 21 operates to sum these applied voltages and generate a signal indicative of any net result.

Figure 4:
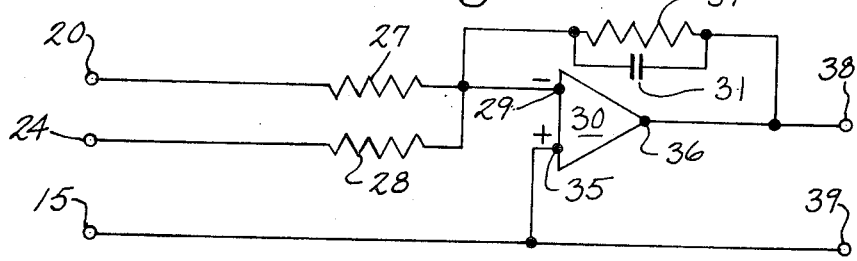
FIG. 4 is an electrical schematic diagram of an annunciator circuit which forms a part of the circuit in FIG. 1.

Referring to FIG. 4, the annunciator circuit 21 includes a first coupling resistor 27 connected to input terminal 20 and a second coupling resistor 28 connected between input terminal 24 and the other lead of first coupling resistor 27. First and second coupling resistors 27 and 28 connect to an inverting input terminal 29 on an operational amplifier 30. A non-inverting terminal 35 on the operational amplifier 30 connects to reference point 15, and an output terminal 36 connects through a feedback resistor 37 to the inverting input terminal 29. Feedback resistor 37 is shunted by a roll-off capacitor 31. The output terminal 36 and reference point 15 connect respectively to output terminals 38 and 39 of the annunciator circuit 21.

The operational amplifier 30 is a commercially available amplifier circuit which is connected to a plus and minus d-c power supply (not shown in the drawings). It has a differential output stage and its output terminal 36 is driven positive or negative in response to the net current flow out of or into its inverting input terminal 29. The values of coupling resistor 27 and 28 and feedback resistor 37 determine the voltage gain of the amplifier circuit.

Annunciator circuit 21 operates to generate an a-c voltage across its output terminals 38 and 39 when the a-c voltage applied to input terminal 20 is *not* coincident with, or in other words, equal in amplitude and 180 degrees out of phase with the a-c voltage applied to input terminal 24. The annunciator circuit 21 operates to sum the phasors $V_2'$ and $V_3'$ and generate the net result across the output terminals 38 and 39. As shown in FIG. 2, $V_2'$ and $V_3'$ are coincident under normal operating conditions, and as a result the current entering and leaving the amplifier inverting input terminal 29 through first coupling resistor 27 is completely cancelled by the current entering and leaving through second coupling resistor 28. The annunciator signal is zero, thus indicating that the three-phase power on the power lines 10, 11 and 12 is balanced and in the phase sequence indicated.

Figure 3:
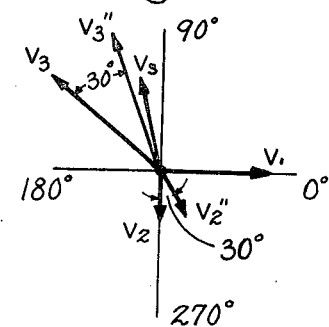

If the currents become imbalanced in the power lines 10, 11 and 12, a non-zero annunciator signal will be generated at the output terminals 38 and 39. The effect of this abnormal condition is indicated by the phasor diagram in FIG. 3, where the phasors $V_2$ and $V_3$ again indicate the voltages generated across second and third phase resistors 17 and 18. Note that when the 30-degree phase shift is imparted to each phasor $V_2$ and $V_3$, the resulting phasors $V_2''$ and $V_3''$ are not 180 degrees out of phase. Their sum, as indicated by phasor $V_s$, is not zero and a substantial a-c annunciation signal is generated at the output terminals 38 and 39 of the annunciator circuit 21. The annunciator signal is applied directly to an a-c warning device such as a light (not shown) or to the coil of a relay (not shown in the drawings) which operates to disconnect the load 14 from the power lines 10, 11 and 12. In the latter case, the sensitivity of the relay is adjustable to provide a threshold. This is particularly useful where minor, relatively harmless, current imbalances which result in the generation of a low amplitude annunciation signal are to be ignored. The threshold of the relay, or alternatively, the gain of the annunciator amplifier, is adjusted so that no response is made to harmless current, voltage, or phase imbalances.

Figure 5:
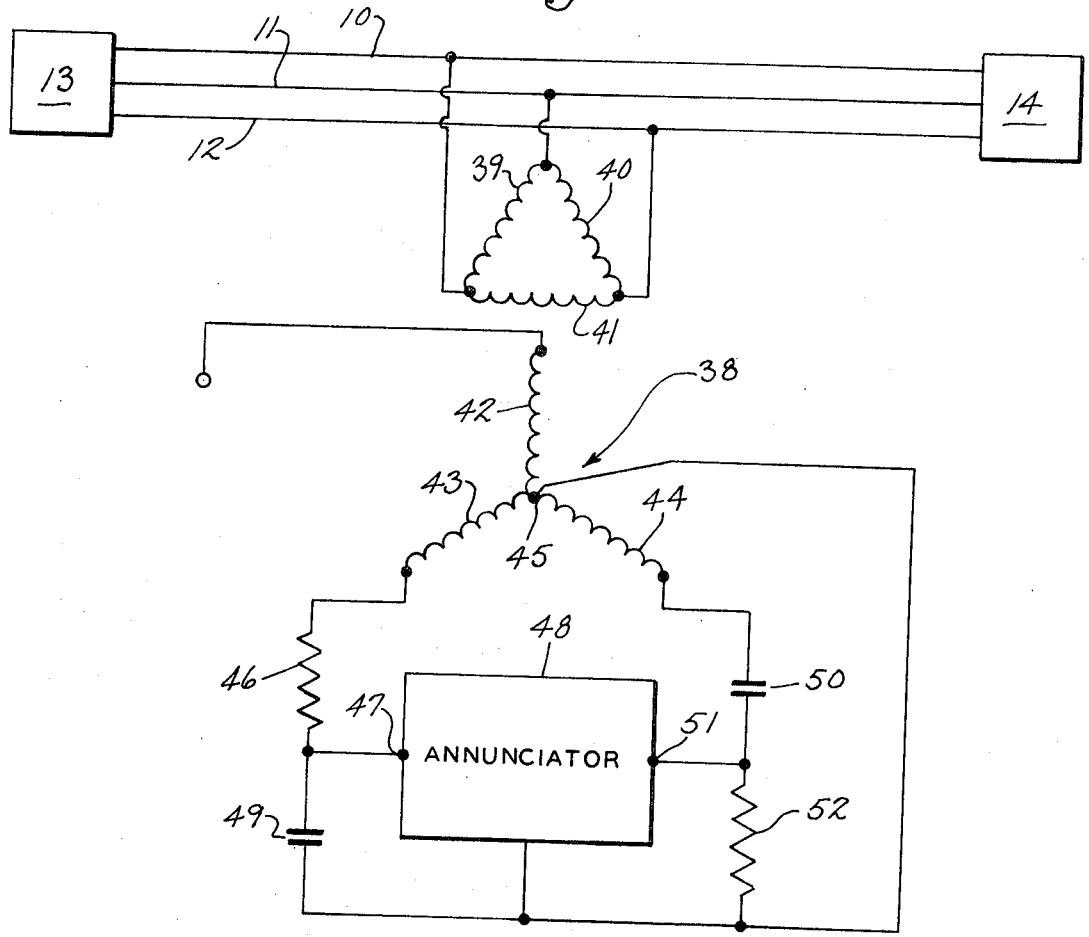
FIG. 5 is an electrical schematic diagram showing an alternate means of implementing the invented method.

An alternative circuit for implementing the invented method is shown in FIG. 5. In this second embodiment, three referenced phases are established by means of a Δ-Y transformer 38. The transformer primary winding includes a first section 39 connected across power lines 10 and 11, a second section 40 connected across power lines 11 and 12, and a third section 41 connected across power lines 10 and 12. The transformer secondary winding includes a first phase winding 42, a second phase winding 43 and a third phase winding 44. One lead of each of the phase windings 42, 43 and 44 connects to a reference point 45. The other lead of second phase winding 43 connects through a first resistor 46 to an input terminal 47 on an annunciator circuit 48. Input terminal 47 connects through a first capacitor 49 to the reference point 45. The other lead on the third phase winding 44 connects through a second capacitor 50 to a second input terminal 51 on annunciator circuit 51. Second input terminal 51 connects through a second resistor 52 to the reference point 45.

Figure 6:
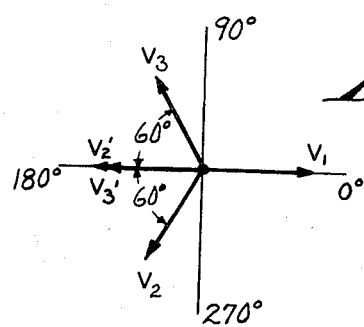
FIG. 6 is a phasor diagram which indicates the phase relationship of voltages at various points in the circuit of FIG. 5.

The transformer 38 operates to generate three referenced voltage phases, one across each of the phase windings 42, 43 and 44. These referenced phases are represented by the respective phasors $V_1$, $V_2$ and $V_3$ in FIG. 6. First resistor 46 and first capacitor 49 impart a 60° phase lag to the referenced phase generated across second phase winding 43. This is visually indicated in the phasor diagram by rotating the phasor $V_2$ clockwise 60°, aligning it with the 180 degree axis. The resulting voltage represented by the phasor $V_2'$ is applied to the annunciator input terminal 47. The second capacitor 50 and second resistor 52 impart a 60° phase lead to the referenced phase generated across third phase winding 44. This is indicated by rotating the phasor $V_3$ counterclockwise 60° also aligning it with the 180° axis. The resulting voltage represented by phasor $V_3'$ is applied to annunciator input terminal 51.

Under normal operating conditions the a-c voltage applied to annunciator input terminal 47 is equal in magnitude and in-phase with the a-c voltage applied to its input terminal 51. On the other hand, if a current imbalance, phase loss, or phase reversal occurs, the three referenced voltage phases represented by phasors $V_1$, $V_2$ and $V_3$ are not equal in magnitude nor equally displaced 120° apart. As a result, the 60° phase shift imparted to each phasor $V_2$ and $V_3$ will not render them coincident. Voltages of differing amplitude and phase are therefore applied to annunciator input terminals 47 and 51.

Figure 7:
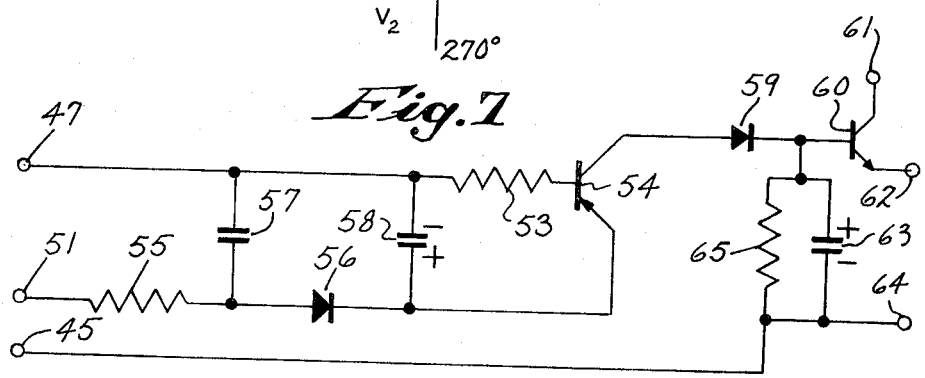
FIG. 7 is an electrical schematic diagram of an annunciator circuit which forms a part of the circuit in FIG. 5.

Referring to FIG. 7, the annunciator circuit 48 is adapted to sense the difference between the applied phasors $V_2'$ and $V_3'$. It includes a base resistor 53 connected between the input terminal 47 and the base of a PNP transistor 54, and a coupling resistor 55 connected between input terminal 51 and the anode of a first diode 56. The cathode of the first diode 56 connects to the emitter of PNP transistor 54. A shunt capacitor 57 connects between input terminal 47 and the anode of first diode 56, and a charging capacitor 58 connects between input terminal 47 and its cathode.

Coupling resistor 55 and shunt capacitor 57 serve to dissipate voltage spikes applied to the input terminals 47 and 51. The first diode 56 rectifies any difference voltage generated across charging capacitor 58. When the voltages represented by phasors $V_2'$ and $V_3'$ are not coincident, such a difference voltage is generated, and charging capacitor 58 accumulates a charge. When the resulting voltage developed across capacitor 58 is large enough to forward bias the base-emitter junction of PNP transistor 54, it becomes conductive.

The collector of PNP transistor 54 connects through a second diode 59 to the base of an NPN transistor 60. The collector of NPN transistor 60 connects to a positive d-c supply terminal 61 and its emitter connects to an output terminal 62. The base of NPN transistor 60 connects through a second charging capacitor 63 to both the reference point 45 and a second output terminal 64. A bypass resistor 65 is connected in shunt relation with second charging capacitor 63.

When PNP transistor 54 conducts, thus indicating an abnormal condition on the power lines 10, 11 and 12, current flows through second diode 59 and charges second charging capacitor 63. The voltage thus established across charging capacitor 63 is also established across output terminal 62 and 64. NPN transistor 60 provides current amplification to drive a suitable warning device (not shown in the drawings) connected to output terminals 62 and 64.

Both embodiments described herein operate on the same general principle. Both sense each voltage phase and refer each to a common reference point, or reference voltage. The phase relationship between two of these referenced voltage phases is then altered in such a manner that coincidence between them is obtained only when the polyphase voltage source is balanced and in a specific, or desired phase sequence. An annunciator circuit detects the lack of coincidence and generates an annunciation signal that may operate to warn of the improper condition or automatically disconnect the load from the power source.

We claim:

1. A method for detecting both phase failures and current imbalances in a polyphase voltage source, the steps comprising:

establishing a neutral reference voltage to which all the phases are referred through equal impedances;

selecting a pair of referenced voltage phases and imparting a relative preset phase shift to them to render them coincident when the polyphase voltage source is balanced; and combining the selected pair of phase-shifted voltage phases to generate an annunciation signal.

2. The method as recited in claim 1 wherein the polyphase voltage source has three phases and the selected pair of referenced voltage phases are shifted sixty degrees with respect to each other such that they are equal in magnitude and 180° out of phase with each other when the polyphase voltage source is balanced.

3. The method as recited in claim 2 wherein each selected referenced voltage phase is phase shifted 30°.

4. The method as recited in claim 2 wherein the selected pair of phase-shifted voltage phases are combined by summing them together to generate the annunciator signal.

5. The method as recited in claim 1 wherein the polyphase voltage source has three phases and the selected pair of referenced voltage phases are shifted 120° with respect to each other such that they are equal in magnitude and in phase with each other when the polyphase voltage source is balanced.

6. The method as recited in claim 5 wherein each selected referenced voltage phase is phase shifted 60°.

7. The method as recited in claim 5 wherein the selected pair of phase shifted phases are combined by subtracting them from one another to generate the annunciation signal.

8. A phase failure and phase reversal detection circuit for a polyphase voltage generated on a plurality of power lines, the combination comprising:
 a plurality of phase resistors, one connecting each power line to a reference point;
 phase shift means connected across one of said phase resistors to impart a preset phase shift to the referenced voltage generated across it; and
 an annunciator circuit connected to receive said phase-shifted voltage from said phase shift means and connected to another of said phase resistors to receive the referenced voltage generated across it, said annunciator circuit being operable to sum said two received voltages and generate an annunciation signal indicative of the net result.

9. A phase failure and phase reversal detection circuit as recited in claim 8 which includes second phase shift means connected to impart a preset phase shift to the referenced voltage generated across the other of said phase resistors and to said annunciator circuit,
 wherein one of said phase shift means imparts a phase lead and the other imparts A phase lag to the applied referenced voltage.

* * * * *